United States Patent [19]
Johnson et al.

[11] Patent Number: 4,870,779
[45] Date of Patent: Oct. 3, 1989

[54] MAGNETIC RODENT CONTROL METHOD

[75] Inventors: Neale E. Johnson, Monterey, Calif.; Carmen F. Markham, P.O. Box 1294, Pebble Beach, Calif. 93953

[73] Assignee: Carmen F. Markham, Monterey, Calif.

[21] Appl. No.: 148,158

[22] Filed: Feb. 1, 1988

Related U.S. Application Data

[63] Continuation-in-part of Ser. No. 873,043, Jun. 3, 1986, abandoned, which is a continuation of Ser. No. 526,359, Aug. 25, 1983, abandoned.

[51] Int. Cl.$^4$ ............................................... A01M 1/20
[52] U.S. Cl. ..................................... 43/124; 116/22 A
[58] Field of Search ................ 43/98, 124; 340/84 E, 340/573; 367/139; 116/22 A

[56] References Cited

U.S. PATENT DOCUMENTS

| | | | |
|---|---|---|---|
| 3,872,472 | 3/1975 | Moschgat | 43/124 |
| 4,097,838 | 6/1978 | Fiala | 367/139 |
| 4,178,578 | 12/1979 | Hall | 43/124 |
| 4,215,429 | 7/1980 | Riach | 116/22 A |
| 4,484,315 | 11/1984 | Hall | 43/124 |

FOREIGN PATENT DOCUMENTS 2033812  1/1972  Fed. Rep. of Germany ...... 367/139

Primary Examiner—Kurt Rowan
Attorney, Agent, or Firm—Joseph H. Smith; Leslie G. Murray

[57] ABSTRACT

A method whereby a low frequency, randomly varying magnetic field is generated by a device such that it interacts with the earth's geomagnetic field to eliminate rodents and similar pests both above and below ground which inhabit an area surrounding the device. The method is not limited to, but may comprise an electromagnetic system that energizes and de-energizes one or more of a plurality of electric coils according to a predetermined sequence, thereby generating a specific low frequency magnetic field over a defined zone of influence. This magnetic field modulates and interacts with the earth's natural magnetic field (the geomagnetic field) thus inducing remanent defensive instinct responses in rodents and similar pests residing within the zone of influence. The effect, of the method, is to interfere with the pest's primitive survival and navigational instincts necessary for survival. When these primary instincts are interfered with in this manner, the pest becomes severely disoriented and eventually ceases to eat, drink and reproduce. The result of employing the method is that the pest dies from dehydration and starvation.

16 Claims, 5 Drawing Sheets

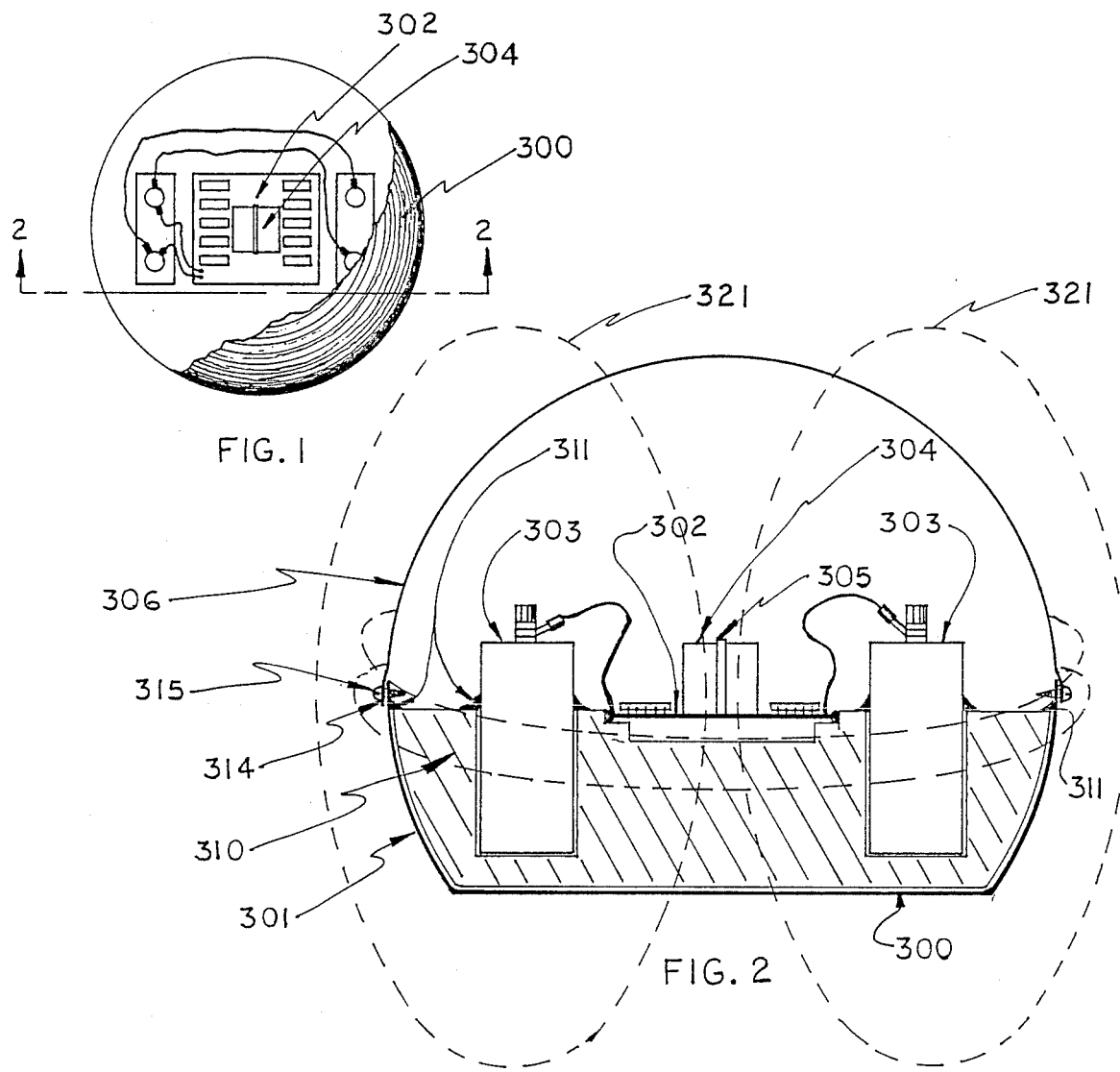
FIG. 1
FIG. 2
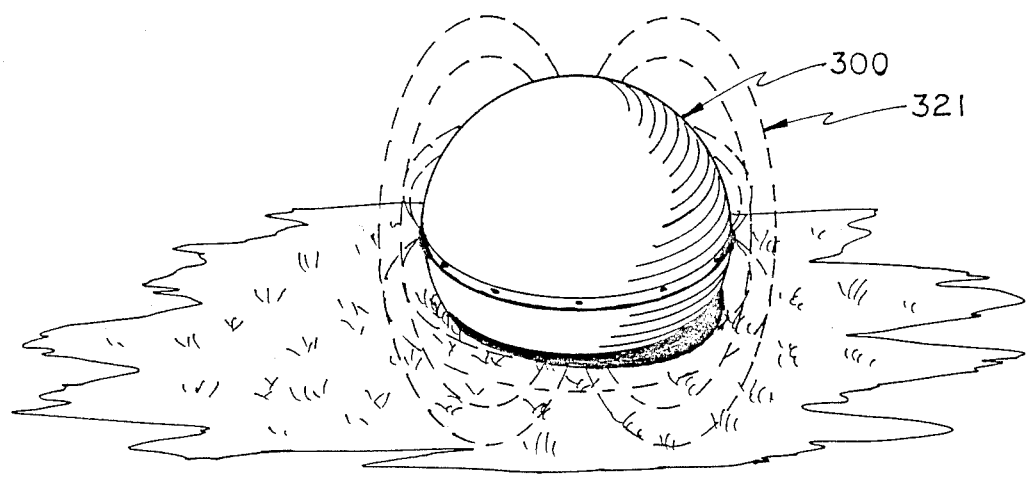
FIG. 3

MAGNETIC RODENT CONTROL METHOD

CROSS REFERENCE TO RELATED APPLICATION

This is a continuation-in-part of co-pending application Ser. No. 873,043 filed on June 3, 1986 now abandoned which is a continuation of Ser. No. 526,359 now abandoned, filed Aug. 25, 1983.

BACKGROUND OF THE DISCLOSURE

The present invention relates generally to rodent control devices and, more specifically, to a device for the generation of a low frequency randomly varying magnetic field to control and eradicate rodents and the like.

This invention describes a totally new and useful method for the control of rodents and other pests by inducing randomized low frequency modulation of the earth's natural magnetic field into localized areas. Many methods have been devised for the control of rodents and other pests, but all pose serious limitations or problems. Currently the two most widely used methods involve the use of spring loaded traps and poisoned feed to kill individual animals. The unavoidable problems with these methods are the great danger they pose to small children and pets, the need for constant servicing and monitoring, the high continual cost required to maintain control, contamination of the environment, and the need to dispose of dead animals.

Recently, other types of devices have been proposed which electrocute individual animals, but the systems are costly, dangerous to man and animals, and of very limited effectiveness, since they require direct contact with individual animals. One such device is disclosed in U.S. Pat. No. 4,048,746 to Joseph R. Dye. Other devices have employed the use of various types of vibrating elements to inject sonic waves and physical vibrations into structures or into the earth to disturb rodents and drive them from the vicinity. Still other devices have been produced which generate ultrasonic waves into the local environments. Tests have shown that virtually all pests quickly adapt to these types of disturbances and within a brief period ignore them altogether. Further, ultrasonics and similar means do not irradicate these pests but, if effective at all, may simply displace them to an adjoining area or structure.

Further variations of such sonic, ultra-sonic or seismic devices have been presented with combinations of pulsating or randomizing devices to vary the intensity and pattern of the sound waves or vibrations in an attempt to prevent adaption of the pest to the device. Both Englebert Fiala in U.S. Pat. No. 4,215,429 as well as German Patent No. 2,033,812 propose devices of this latter type, primarily for the purpose of injecting sonic waves directly into the earth to drive away burrowing rodents. However, since the real world consists of all kinds of equipment, motors, vehicles and systems that generate sound and vibration, rodents still quickly adapt to such disturbances once they learn that no real danger exists. Further, none of these devices is designed to irradicate the pests but merely to drive them from a specific area.

SUMMARY OF THE INVENTION

The present invention overcomes all these disadvantages by providing a randomly varying, low frequency magnetic field rodent control method that, unlike any variation of the prior art, interferes with the pest's remanent magnetic navigational instincts and which has the resultant effect of erradicating all rodents within the zone of influence.

The effect of the invention on the pest is that it induces a severe defensive reaction that is virtual trauma causing extreme disorientation. Thus the method of the patent is effective at controlling large areas with absolutely no danger to man, domesticated animals or the environment. Devices which employ the method of the invention are of moderate cost, do not require any physical attachment to structures of the earth, are easily deployed, inexpensive to maintain, and are also capable of being very rugged and reliable.

A preferred embodiment of the invention comprises an electro-magnetic system for energizing and de-energizing electric coils wound on specially configured, aluminum coated nylon cores. One or more of a plurality of these specially configured electric coils are energized according to a predetermined sequence, thereby generating a randomly varying specific frequency magnetic field which interacts with the geomagnetic field to generate a relatively uniform magnetic field over localized areas. These electric coils produce only magnetic fields and do not produce sonic or ultrasonic vibrations of any kind. Variations and equivalents of the invention are possible and The electro-magnetic system generates a field of relatively uniform field strength over one area, and extending outwardly therefrom at a decreased uniform field strength. An increased field coverage occurs when a plurality of systems are located in such a manner that the magnetic fields resulting therefrom slightly overlap.

The magnetic fields generated by the electro-magnetic system, as an example, are produced by the application specific low frequency of voltage pulses of varying magnitude and of both positive and negative polarities causing energizing and de-energizing of the electric coils thus producing the specific frequency magnetic fields useful for controlling the behavior of pests and comprised of randomly varying flux patterns.

When these magnetic fields interact with the geomagnetic field, the resulting modulated field seriously disturbs certain rodents and similar pests generally classified as lower developed vertabrate in the scale of nature, or those species mostly unchanged over time by evolution. As these pests still rely upon the geomagnetic field for remanent survival instincts, behavioral patterns and navigational codes, they react to these varying flux patterns in such a way that their primitive survival and navigational instincts are interfered with. The pests are alarmed by the disturbance they sense in the geomagnetic field generated by the invention and react by attempting either to escape from or otherwise defend against the field, resulting in a continual state of extreme stress and anxiety. This defensive activity continues until the pest becomes disoriented and ceases to eat, drink or reproduce, with the result of death from dehydration and starvation. As an example, a rat expires in only two days if deprived of water. Subsequently, complete eradication of rodents and similar pests in the defined zone of influence is the final result. Further, control of pests in this zone can be maintained permanently as rodents and similar pests just outside the zone of influence sense the disturbance therein and do not enter this zone.

To control behavior of rodents and similar pests over a wider area, the system may be applied as a plurality of systems with slightly overlapping zones of influence.

The invention adds no harmful pollutants into the environment such as those present methods requiring chemicals, poison bombs and poison baits. The effect of using these present methods is a temporary one, as compared to the permanent nature of the invention. The invention produces no harmful radiation, as a preferred embodiment of the invention is battery-operated with low power and therefore, humans, pets and animals evolved in the scale of nature have no reaction to the invention. Nor does the invention depend upon making any kind of specific physical contact with individual naimals in order to have effect. In order to be effective, the strength of the magnetic field generated by a typical system need be no more than 1/100th that radiated by a table-radio, telephone or similar household electrical implements. Further, the systems of the invention are portable and easily transported, making their installation simple and readily attainable even in difficult environmental circumstances.

OBJECTS AND ADVANTAGES OF THE INVENTION

The present invention has for an important object a rodent control method whereby a single device employing the method of the invention can erradicate all rodents and similar pests within the area of its zone of influence by means of generating a specific low frequency, randomly varying sequence magnetic field which interferes with the natural geomagnetic field within the given area.

It is another object of the invention to provide a rodent control method which relies solely on the means of a specific low frequency, randomly varying sequence magnetic field and is not used in combination or conjunction with any other means of controlling or causing a disturbance to rodents or other pests.

It is another object of the invention to provide a rodent control method that will irradicate all such pests within its zone of influence without requiring any physical contact or connection with any structures or the earth, and without requiring any physical contact with individual animals.

It is still another object of the invention to provide a device of the invention which incorporates a plurality of electromagnetic coils on nylon cores mounted with energizing circuitry within an aluminum, or similar non-ferromagnetic material, housing to radiate a specific magnetic field into the surrounding environment including structures and the earth.

It is still another object of the invention to provide a device of the invention that has no moving parts and relatively few components.

It is a further object of the invention to provide a device of the invention which is compact, light-weight and may be battery powered for portability and ease of relocation.

It is a further object of the invention to provide a device of the invention which requires no service or maintenance whatsoever except the periodic recharging or replacement of battery power source.

It is a further object of the invention to provide a method of rodent control that requires only an initial, one-time expense to provide continuing control of a given area.

It is a further object of the invention to provide a device of the invention which is simple in construction, economical in manufacture, and simple and rugged in construction so as to operate well under adverse conditions.

It is a further object of the invention to provide a device of the invention which incorporates pseudo-random number generator means to vary the magnitude and polarity of the means of generating the magnetic field.

It is a still further object of the invention to provide a rodent control method that is completely silent in operation and which does not generate any sound, vibration, or sonic energy of any kind.

It is a still further object of the invention to provide a method of rodent control which may have expandable coverage by employing two or more devices of the invention laid out in a grid pattern with slightly overlapping fields.

It is a still further object of the invention to provide a rodent control method which is harmless to man, to domesticated animals, and animals evolved in the scale of nature, and to the environment.

With the foregoing objects in view and other such objects and advantages as will become apparent to those skilled in the art to which this invention relates as this specification proceeds and are further referred to in the accompanying drawings which represent two possible embodiments, variations are possible which may be made without departing from the principals disclosed, and I contemplate the employment of any structures, arrangements or modes or operation that are properly within the scope of the appended claims.

DESCRIPTION OF DRAWINGS

FIG. 1, is a plan view of one embodiment of the method of the invention, sectioned in part to show the interior thereof, the arrangement of components, and the construction, FIG. 2, is a side elevation section substantially along the line 2—2 of FIG. 1.

FIG. 3, is a pictorial view of the embodiment of FIG. 1 shown sitting on the ground.

DESCRIPTION

Figures 4, 5:
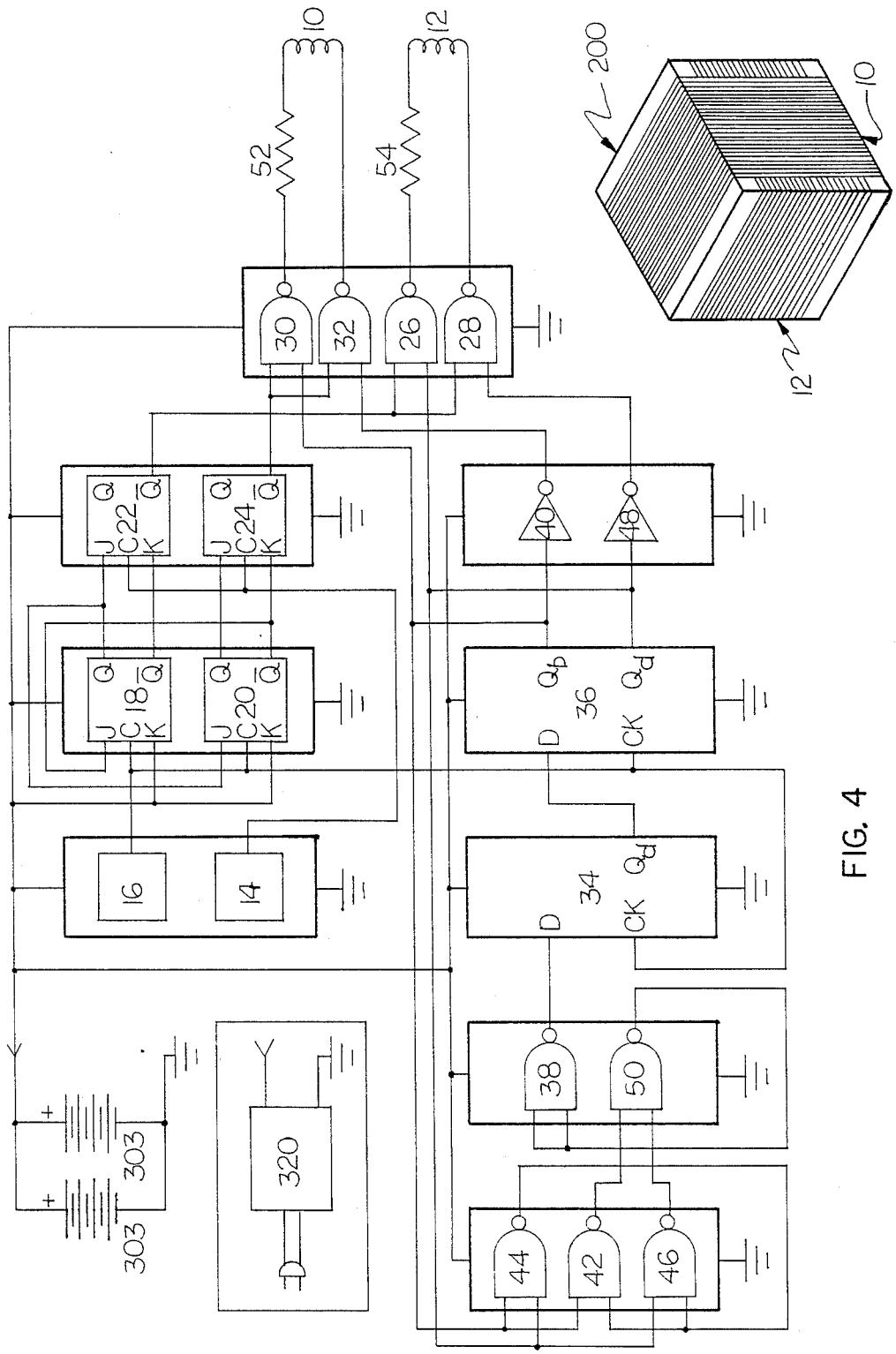
FIG. 4, is a schematic wiring diagram of the embodiment shown in FIG. 1.
FIG. 5, is an isometric view of a specially configured nylon core coil assembly suitable for use with the circuit of FIG. 4.

A principal concept of the invention is to generate a varying magnetic field which is locally superimposed on the earth's magnetic field to appear to have become a part of it. Therefore, to biological objects which have the ability to interact with and derive information from the earth's field, the field injected by the apparatus is not discernably different from the earth's field. The information thus derived from these fields affect both navigational systems and defensive systems of the biological object. Such interaction will hereinafter be described as earth-strength magnetic stimulation. Experimental evidence has also shown that there is typically an upper amplitude limit to the stimulation of these magnetic effects with biological objects, and that this level corresponds to the strength of the earth's magnetic field. For this reasons the magnetic field produced by the apparatus described below is generally kept at a very low level, typically at or below earth-strength level fields, ie. less than about 0.06 mT. No lower limit has yet been determined, however, it is known that field strengths of only 100 Gamma ($100 \times 10^{-9}$T) or less have proved effective. For example honey-bees have been seen to respond to magnetic field variations as low as 0.00001 mT. Also, it is known that birds use local variations in the earth's magnetic field for navigation and orientation. Similarly, it is believed that rodents, insects, and the like also respond to the earth's magnetic field and that the apparatus of the invention disrupts their normal response, thereby leading to their eradication as indicated earlier.

Additionally it is believed that the frequency range of the disruptive magnetic field is also of importance. Research appears to indicate that maximum effectiveness occurs when the primary frequency f1 of the magnetic disruptions is such that $0 f1 \leq 40$ Hertz, and that above 40 Hertz the effects fall off rapidly. At the present time, a preferred frequency of 2 Hz appears to be particularly good for rats, mice, ground squirrels, gophers, and cockroaches. Testing appears to indicate that there is no response to weak magnetic fields at 60 Hz and above. The exact mechanisms that define this interaction are not yet understood, but it is has been demonstrated that certain cells or glands act as magneto-receptors and display large responses to applied magnetic fields of the frequency and amplitude ranges described above. For example, the pineal gland, which is part of the rodent's natural defense system, is known to display such magneto-sensitivity. It has also been confirmed that magnetic fields as described above act as a stressing agent on rodents and insects and induces alarm reactions. Other reasearch suggests that some form of magnetic resonance phenomenon may be occurring in the above frequency range.

Another important feature of the invention is that there appears to be a variation in effectiveness of the bio-magnetic stimulation depending on geographic location. Hence, it is important for optimum results to properly align the magnetic field of the apparatus with the direction of the earth's local magnetic field where the apparatus is used.

Referring first to FIG. 1, there is shown a first embodiment of the invention enclosed in a spherical housing 300 having a flattened bottom although other convenient configurations are possible. The material of the housing is made of an easily formable, non-ferromagnetic material such as aluminum. It appears that a housing 300 of such shape and similar non-ferrous material enhances distribution and shape of the resulting magnetic field as represented by dashed lines 321 in FIGS. 2 and 3 and may optionally be analogized to an antenna although the housing is not electrically connected to the circuitry. It is understood that the spherical housing disclosed in exemplary only, and other housings will produce differently configured but still suitable field geometries. The plan view of FIG. 1 and the section view of FIG. 2 show the simplicity of construction and design. The electric circuit board 302 contains all operational components except for the two lantern batteries 303 which are wired in parallel as the power source for the device. It is understood that the device could operate just as effectively if powered by external batteries or external 115 volt, 60 cycle AC power supply or similar power source which can be converted into low voltage direct current. Batteries are used solely for the purpose of illustration and for their disireability to provide portability and ease of relocation of the device.

As can be seen in the section view of FIG. 2, the housing 300 is composed to two halves, upper half 300 and lower half 301 to provide accessibility to components. An overlapping lip 314 is formed in upper half 306 to provide a mating fit of the two halves. Sheet metal screws 315 are installed around the circumference of the housing so that lip of upper housing half 300 and the lip 314 of lower housing half 301 are securely fastened together. All major components of the device sit in a molded styrofoam insert 310 which acts as as the mounting system. This mounting system is exemplary only and many other commonly used mounting methods are equally suitable. The circuit board assembly 302 and batteries 303 are secured to the insert and a bead 311 of commonly available RTV silicon rubber cement. A similar bead 311 of RTV secures the insert 310 with its components to the lower housing unit 301.

The circuit board assembly 302 has all circuit components affixed to it that are illustrated in the schematic wiring diagram of FIG. 4, except the batteries. All integrated circuits and other components shown in the schematic are commonly available, industry standard devices. Electrical interconnection of components may be carried out either by hand-wiring individual connection points together or by the use of conventional printed wiring techniques. The arrangement of components on the circuit board is non-critical. Affixed to the center of circuit board assembly 302 is the magnetic field coil assembly 304 containing coils 10 and 12 on nylon core 200, (as shown in FIG. 5) and is secured in place by plastic mounting strap 305.

Referring to FIG. 5, the same illustrates a presently preferred embodiment of the magnetic field coil assembly 304 for use with the circuit shown in FIG. 4. While substantial variation is within the contemplation of the invention, the embodiment shown comprises a nylon cube 200, typically two inches at edge, which has been coated with aluminum by vapor deposition or other suitble means. Two coils 10 and 12, as indicated in FIG. 5, are wound on the cube in an orthogonal relation. The bottom coil 12 typically comprises more than 25 turns of copper wire. The top coil 10 typically comprises more than 12 turns of wire. Each coil typically covers substantially the entirety of each face on which it is wound. Therefore, the cube when wound, appears to be virtually entirely covered with wire.

Referring to FIG. 4, there is shown therein circuitry representing the first embodiment of the invention for energizing and de-energizing two coils 10 and 12 in a manner which has been found effective in the control of rodents. The focus of the present invention is on the manner in which the coils 10 and 12 generate an energy field. As has been discussed in detail in connection with FIG. 5, each of the coils 10 and 12 typically comprise a plurality of turns of conductive wire wound in an orthogonal direction on an aluminum covered nylon core, 200.

The timing for selectively energizing and de-energizing the coils 10 and 12 is provided by a first timer 14 and a second timer 16. Both timers are contained in a single integrated circuit device of which an exemplary type is an NE-556. The first timer 14 provides a clocking signal to that portion of the circuitry which primarily controls the energization of the coils 10 and 12, while the second timer 16 provides a clocking signal to a portion of the sequencing circuitry. The first timer 14 may, typically, have an output frequency f1 between zero and 40 Hertz, and the second timer 16 typically may have an output frequency of 400-800 hertz. The frequency of the second timer 16 may be varied, but experiments have shown 400-800 hertz an acceptable frequency range for diversified applications. The output of the timer 16 is applied as a clocking input to a JK flipflop 18, the K input of which is tied high. The J input of the flipflop 18 is provided by the Q-bar output of a second JK flipflop 20. The Q output of the JK flipflop 18 is applied to the J input of the JK flipflop 20, with the K input thereof being tied high: the Q output of the JK flipflop 18 also provides the J input of a third JK flipflop 22. The clock of the JK flipflop 20 is provided by the output of the second timer 16. The Q-bar output of the JK flipflop 18 provides the K input of the JK flipflop 22. The Q output of the JK flipflop 20 provides the J input of a fourth JK flipflop 24, while the Q-bar output of the JK flipflop 20 provides the K input of the JK flipflop 24. The clock input of the JK flipflops 22 and 24 is provided by the output of the first timer 14. The two flip-flops 18 and 20 are contained in a single integrated circuit device of which an exemplary type is a 74S112; the same is true for flipflops 22 and 24.

The Q-bar output of the JK flipflop 22 provides an input to each of the two two-input nand gates 26 and 28. Similarly, the Q-bar output of the JK flipflop 24 provides an input to two-input nand gates 30 and 32. All 2-input Nand gates refered to in this embodiment are contained in multiple device integrated circuit packages of which an exemplary type is a 74S00.

The second timer 16 also provides a clocking signal to a first four bit shift register 34 and a second four bit shift register 36. The data input of the first shift register 34 is provided by the output of an inverter 38. Shift registers 34 and 36 are integrated circuits of which an exemplary type is a 74LS95. The fourth output QD of the shift register 34 provides the D-input to the shift register 36. The second, or QB output of the shift register 36 provides the input to an inverter 40, one input of a two-input nand gate 42, and one input of a two input nand gate 44. The QB output of the shift register 36 also provides the remaining input to the two-input nand gate 30.

The fourth output QD of the shift register 36 provides an input to a two-input nand gate 46, a two-input nand gate 44, an inverter 48, and the remaining input of the two-input nand gate 26.

The remaining input to the two-input nand gate 32 is supplied by the inverter 40. Similarly, the remaining input to the two-input nand gate 28 is supplied by the output of the inverter 48. Inverters 40 and 48 are contained in an integrated circuit of which an exemplary type is a 74S04. The output of the two-input nand gate 44 supplies the remaining inputs to each of the nand gates 42 and 46. The output of the nand gates 42 and 46 provides the inputs for a two-input nand gate 50, which provides the input to inverter 38.

The output of the nand gate 30 connects to a current limiting register 52, which in turn connects to one terminal of the coil 10; the output of the nand gate 32 connects to the remaining terminal of the coil 10. Similarly, the output of the nand gate 26 connects to a current limiting resistor 54, which in turn connects to one terminal of the coil 12, and the remaining terminal of the coil 12 is connected to the output of the nand gate 28. Current limiting resistors 52 and 54 typically are low power carbon devices with an exemplary value of 27k ohms.

JK flipflops 18 and 20 are connected to provide a repeating sequence at their respective Q outputs on the order of 001001. This connection of JK flipflops 18 and 20 is primarily designed to avoid a 1-1 transition at their respective Q outputs. The Q and $\overline{Q}$ outputs of the flipflop 18 and 20 are then fed to JK flipflops 22 and 24, as described above. Each leading edge of the first timer 14 causes to be stored at the Q outputs of flipflops 22 and 24 either a 00, 01, or 10 pattern generated by the Q outputs of flipflops 18 and 20. Because of the phase difference between the two-free running timers 14 and 16, the 00, 10, 01 patterns will be stored pseudo-randomly. In this manner, the $\overline{Q}$ outputs of the flipflops 22 and 24 provide pseudo-random arming signals at a 1-100 hertz rate to the nand gates 26 and 28, and 30 and 32 respectively. The remaining inputs of the nand gates 26, 28, 30 and 32 are controlled by the outputs of shift register 36.

The outputs of shift register 36 are determined by the logic function performed on the QB and QD outputs of shift register 36 by nand gates 38, 42, 44, 46 and 50. The nand gates 42, 44, 46 and 50 perform an "exclusive or" function. The "exclusive or" function combined with the inverter 38 and the shift registers 34 and 36 provide a psuedo-randon number generator.

For the particular embodiment disclosed, a period of approximately forty seconds occurs between repetitions of the pattern. Because of the pseudo-randomness of the outputs from shift register 36, it can be seen that the frequency at which coils 10 and 12 energize and de-energize will also be pseudo-random. However, it should be noted that one of the coils 10 and 12 will always be energized. Current flow may be in either direction through the coils 10 and 12 depending upon the state of the nand gates associated therewith. For example, nand gate 30 may sink current provided to coil 10 by nand gate 32, and vice versa. The functions of nand gates 26 and 28, which control the coil 12, an analogous to the functions of nand gates 30 and 32, respectively.

Should greater randomness be desired in the operation of the embodiment shown in FIG. 4, an increase in the number of shift register bits being employed will increase such randomness.

Figure 6:
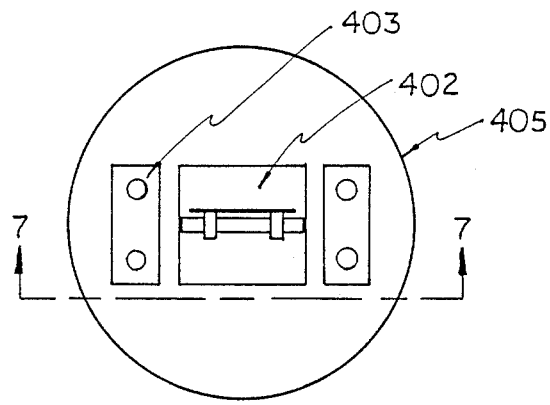
FIG. 6, is a plan view of a second embodiment of the method of the invention, sectioned in part to show the interior thereof, the arrangement of components, and the construction.
Figure 7:
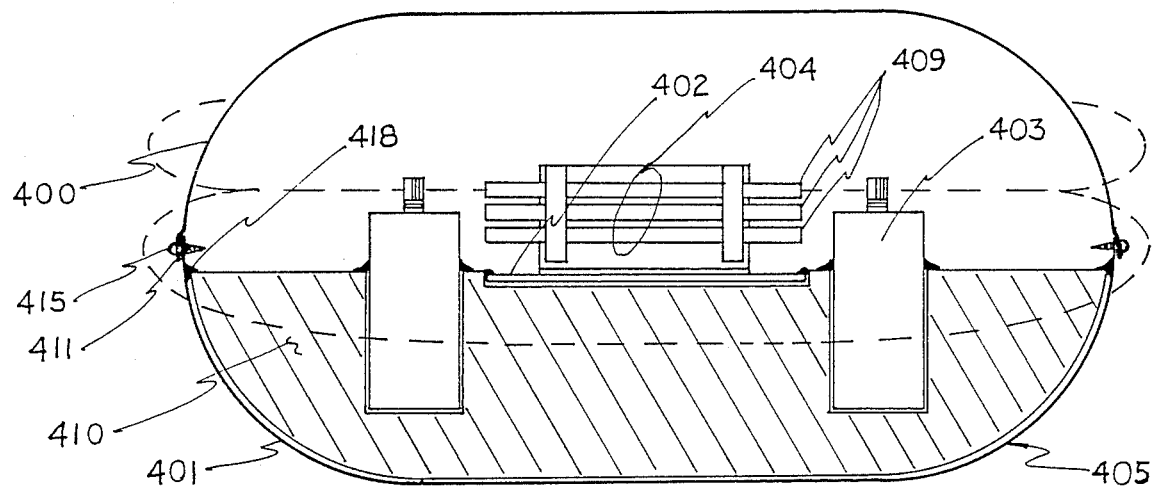
FIG. 7, is a side elevation section substantially along the line 7—7 of FIG. 6.
Figure 9:
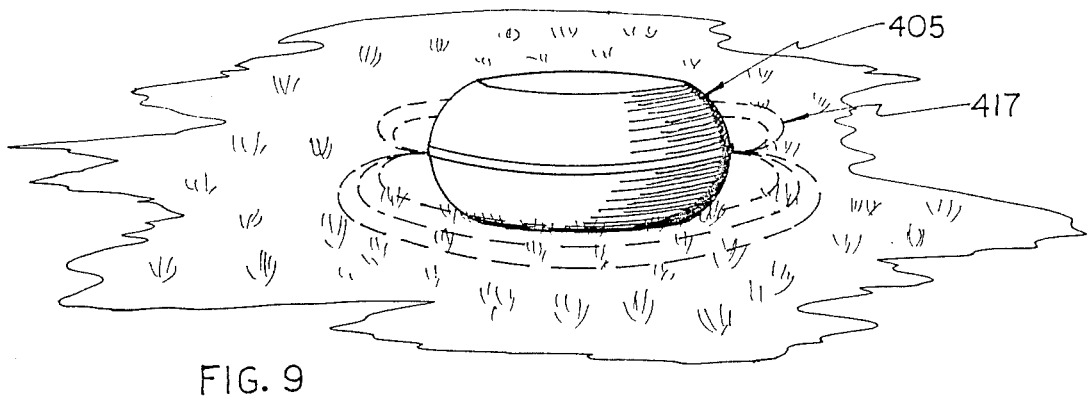
FIG. 9, is a pictorial view of the embodiment of FIG. 6 shown sitting on the ground.

A second embodiment of the invention is shown in a cutaway plan view in FIG. 6 consisting principally of a circuit board assembly 402 and battery power source 403. For purposes of example only, the principal components are shown in FIG. 7 enclosed in a flattened ellipsoid shaped housing 405 consisting of upper and lower halves 400 and 401 respectively. The material of the housing 405 is made of an easily shaped, non-ferromagnetic material such as aluminum or the like. As can be seen in the section view of FIG. 7, an overlapping lip 41 is formed in upper housing half 400 to provide a tight mating fit of the two halves. Sheet metal screws 415 are installed around the circumference of the housing so that the two housing halves are securely fastened together. The housing 405 containing the components is placed either on the floor or grounds as illustrated in FIG. 9, or may be partially buried into the ground surface although no physical contact or connection of any kind is necessary with the supporting surface for proper operation of the unit. It appears that a housing of such shape and similar easily formable non-ferrous material enhances distribution and shape of the resulting magnetic field as represented by dashed lines 417 in FIGS. 7 and 9 and may generally be analogized to an antenna although the housing is not electrically connected to the circuitry. It is understood that the ellipsoidal housing 405 is exemplary only, and other housings will produce differently configured but still suitable field geometries.

The plan view of FIG. 6 and section view of FIG. 7 reveal the simplicity of construction and design. The electric circuit board assembly 402 contains all operational components except for the two lantern batteries 403 which are wired in parallel as the power source for the device. All major components of the device sit in a molded sytrofoam insert 410 which acts as the mounting system. The circuit board assembly 402 and batteries 403 are secured to the insert with a bead 418 of commonly available RTV silicon rubber cement. A similar bead of RTV silicon rubber cement secures the insert with its components to the lower housing half 401.

Figure 8:
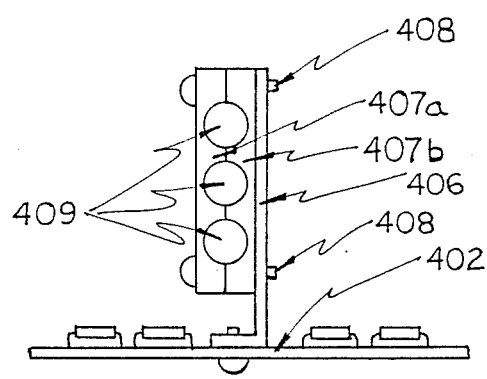
FIG. 8, is a detail view of the magnetic field coil assembly shown mounted to the circuit component board.
Figure 10:
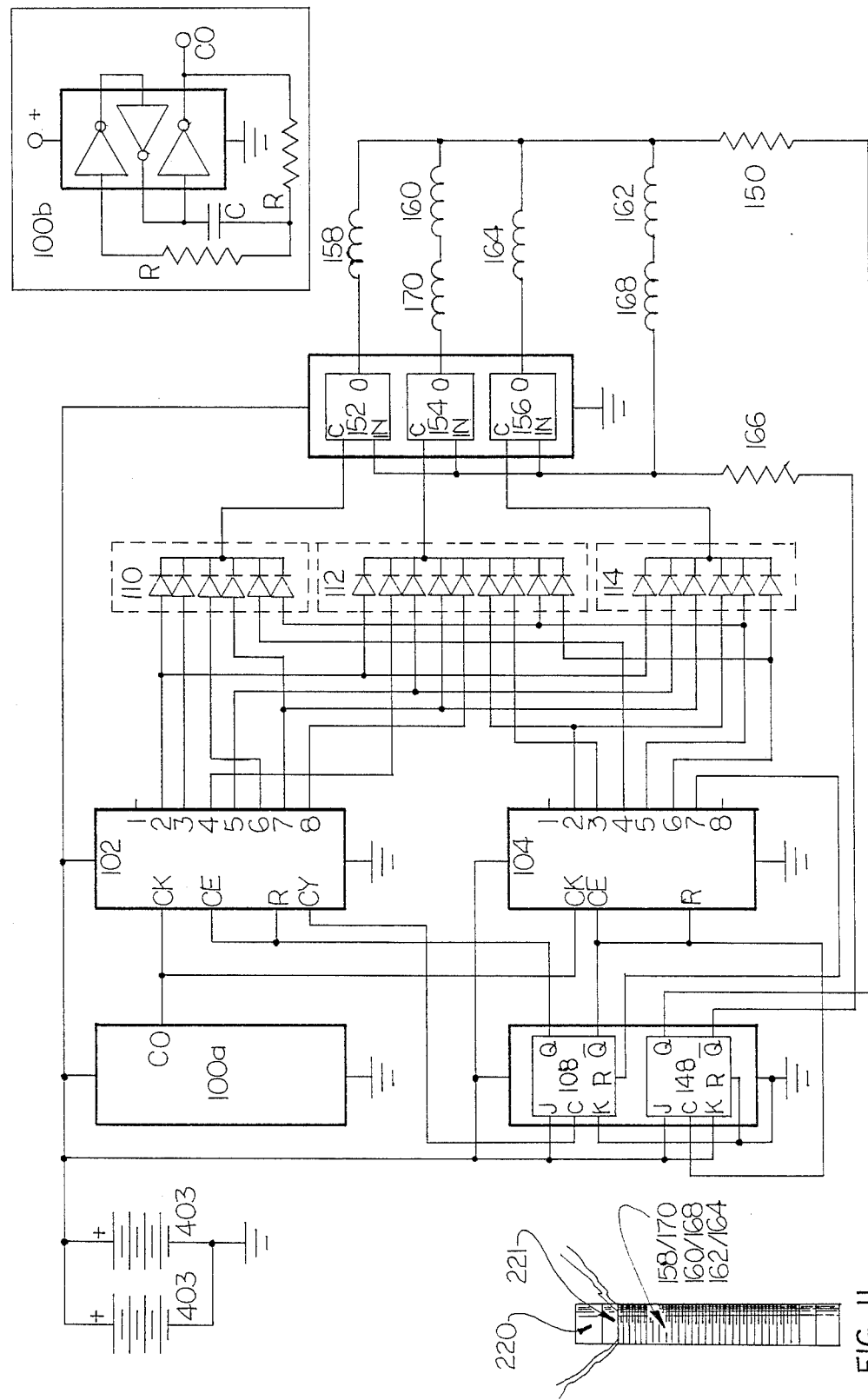
FIG. 10, is a schematic wiring diagram of the embodiment shown in FIG. 6.

The circuit board assembly 402 has all electrical components affixed to it that are illustrated in the schematic wiring diagram of FIG. 10, except the batteries 403. All integrated circuits and other components shown in the schematic are commonly available, industry-standard devices. Electrical interconnection of the components may be carried out either by hand-wiring individual connection points together or by use of a printed wiring technique. The arrangement of components on the circuit board is non-critical. Magnetic field coil assembly 404 is also secured to the circuit board by means of an angle bracket 406 made of aluminum or other non-ferrous material. As seen in the detail view of FIG. 8, all three nylon core coil assemblies 409 are secured to mounting bracket 406 by split mounting clamp 407a and b which is made of phenolic or similar non-ferrous material. Nylon screws 408 secure the clamp 407 to bracket 406 and similarly secure bracket 406 to circuit board 402.

Figure 11:
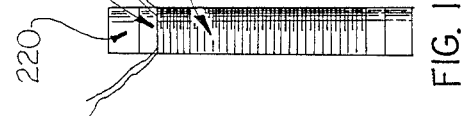
FIG. 11, is a detail view of the specially configured nylon core magnetic field coil suitable for use with the circuit of FIG. 10.

Referring to FIG. 11, there is shown therein a coil form 220 for each of the coils 404 used in the circuit of FIG. 10, or coils 158, 160, 162, 164, 168 and 170. The coil form 220 shown in FIG. 11 is typically one-half inch diameter by 3¼ inches long nylon rod which has been coated with a layer of aluminum 221 by vapor deposition or other suitable means. Two coils are wound on each coil form 220; in the presently preferred embodiment, coils 158 and 170 are wound on the same coil form, coils 160 168 are wound in the same form, and coils 162 and 164 are wound on the same form.

In the presently preferred embodiment, coils 158 and 162 each comprise a bottom layer of 700 or more turns of wire on their respective coil forms. The associated top coils 170 and 164, respectively, comprise 500 or more turns of copper wire wound over the associated bottom coils. The coils 160 (bottom) and 168 (top) are reversed with respect to the foregoing in that the coil 160 comprises 700 or more turns of wire while the coil 168 comprises 500 or more turns of wire.

Referring to FIG. 10, a circuit of the second embodiment of embodying the invention is shown therein which has been found effective in the control of pests. A timer 100a (for which an exemplary integrated circuit device would be an NE 555) or optional oscillator 100b (for which an exemplary integrated circuit device would be a 74LS04 and exemplary values of frequency determining components R and C would be 27 k ohms and 1 mfd respectively), typically designed to operate at a low frequency in f1 such that $0<f1\leq40$ Hertz, provides a clocking input to a first eight-bit binary counter 102. The carry output 106 of the counter 102 provides a clocking input of a JK flipflop 108, the J input of which is tied high and the K input of which is tied low. The —Q input— of the flipflop 108 provides the count enable and reset inputs of the counter 102. The Q0, or least significant, output of the counter 102 provides an 'off' signal for use as described hereinater. The remaining seven outputs (Q1, Q2, Q3, Q4, Q5, Q6, Q7) of the counter 102 provide inputs to three discrete "or" gates 110, 112 and 114, as described hereinafter. Counter 104 operates in a similar manner, with the reset and count enable thereof being provided by the Q-bar output of the JK flipflop 108; however, the least significant output (Q8) and the most significant output (Q15) of the counter 104 are not used. The remaining outputs (Q9, Q10, Q11, Q12, Q13) provide inputs to gates 110, 112 and 114 as described hereafter. The Q14 output of the counter 104 provides the reset input to JK flipflop 108. The two flip-flops 108 and 148 are contained in a single integrated circuit device of which an exemplary type is a 74S112; the counters 102 and 104 are integrated circuits of which an exemplary type is a 4022.

The Q-bar output of JK flipflop 108 also provides a clocking input to a JK flipflop 148, the J and K input thereof being tied high. The Q output of the flipflop 148 is fed through a current limiting resistor 150 to provide an input to one terminal of coils 158, 160, 162 and 164. The Q-bar output of the flipflop 148 is fed through a current limiting resistor 166 and connects to one end of coil 168 and to the input terminal of each of three analog switches 152, 154 and 156. The remaining terminal of the coil 168 connects to the remaining terminal of the coil 162. Current limiting resistors 150 and 166 are low power carbon devices of an exemplary value of 18 k ohms.

The output of the switch 152 connects to the remaining terminal of the coil 158. The output of the switch 154 connects to one terminal of a coil 170, the other terminal of which connects to the remaining terminal of the coil 160.

The output of the switch 156 connects to the remaining terminal of the coil 164. The toggle position of the analog switches 152, 154 and 156 are provided by the outputs of the discrete "or" gates 110, 112, and 114, respectively. Switches 152, 154 and 156 are all contained in a single integrated circuit device of which an exemplary device is a 4066.

The "or" gate 110 comprises a six input discrete diode "or" gate as shown in FIG. 10, with inputs derived from the Q1, Q2, Q5, Q6 outputs of the counter 102, and the Q11 and Q12 outputs of the counter 104. The "or" gate 112 comprises a nine input discrete diode "or" gate having inputs from the Q1, Q3, Q4, Q6, Q7 outputs of the counter 102, and the Q9, Q10, Q12, and Q13 outputs of the counter 104. The "or" gate 114 is a six input discrete diode "or" gate having inputs derived from the Q1, Q4, Q6 outputs of the counter 102 and the Q9, Q12 and Q13 outputs of the counter 104. Gates 110, 112 and 114 are made up of ordinary signal diodes of which an exemplary type is a 1N914.

From the above description, the embodiments of the invention shown in FIG. 10 comprises a sequential device for selectively energizing and de-energizing the coils 158, 160, 162, 164, 168 and 170, in accordance with the states of the counters 102 and 104. It should also be noted that the JK flipflop 148 provides a polarity inversion in the coils depending upon the state of the Q and Q-bar outputs of the flipflop 148. The direction of current flowing through the coils changes depending upon the state of the flipflop 148. Polarity inversion occurs when the state of the JK flipflop 148 changes; this occurs when only the "QO" output of the counter 102 is high, or what is herein defned as the "off" state of each circuit. It will be noted that in the "off" state each of the three switches 152, 154 and 156 is in the "off", or nonconducting state.

The circuitry shown in FIG. 10 is designed to provide at the outputs of the three switches 152, 154 and 156 the output listed in the following table.

| OPERATING SEQUENCE | | | |
|---|---|---|---|
| Decimal Count | Switch 152 | Switch 154 | Switch 156 |
| 1 | 1 | 1 | 1 |
| 2 | 1 | 0 | 0 |
| 3 | 0 | 1 | 0 |
| 4 | 0 | 1 | 1 |
| 5 | 1 | 0 | 0 |
| 6 | 1 | 1 | 1 |
| 7 | 0 | 1 | 0 |
| 8 | 0 | 1 | 1 |
| 9 | 0 | 1 | 0 |
| 10 | 1 | 0 | 0 |
| 11 | 1 | 1 | 1 |
| 12 | 0 | 1 | 1 |
| 13 | 0 | 0 | 0 (polarity inverts) |

At the thirteenth count in the table above, the counter is in "off" position which causes the polarity switch, JK flipflop 148, to reverse polarity. At that time, the counter recycles through the above listed sequence. Thus, the direction of current flow through the coils, when energized, varies every thirteen counts.

Figure 12A:
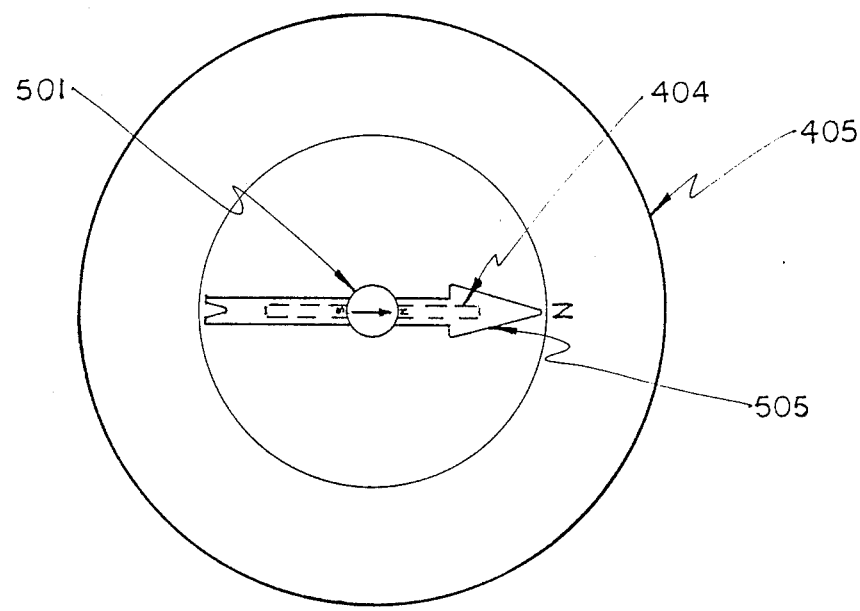
FIG. 12A shows a top view of the apparatus of FIG. 9, showing how the apparatus should be oriented using a compass.
Figure 12B:
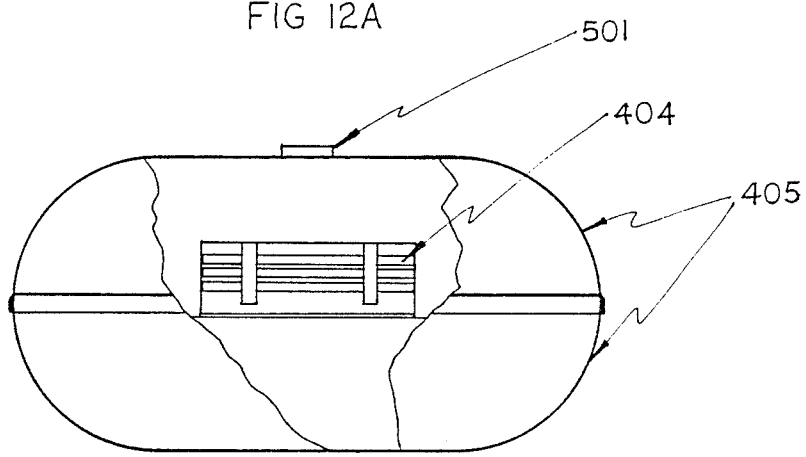
FIG. 12B shows a side view of the apparatus of FIG. 9 showing the relationship between the compass and the apparatus.

Another important aspect of the invention is shown in FIGS. 12A and 12B, where the preferred alignment of the apparatus is demonstrated. In this preferred mode, the apparatus should be oriented such that the axes of the coils 404 are parallel to the earth's surface and parallel with the North-South axis of the geomagnetic field at the site of the apparatus installation. To achieve this, a centerline 505 is applied to the exterior of the apparatus housing which indicates the exact magnetic axes of the coils 404 contained within. A compass 501 is mounted on the centerline 505, and the compass is brought into alignment with magnetic North by rotating the apparatus, thus aligning the principle magnetic direction of the apparatus with the earth's local magnetic field. This North-South orientation with the geomagnetic field has been found to be very important for effective operation, Deviation from this alignment produces rapidly diminishing effects as the apparatus is rotated off the preferred orientation. In controlled experiments, this North-South orientation produced profound changes in the electro-physiology and neurochemistry of the subjects with resultant restless and aggressive behaviour. Other orientations showed no measureable changes.

The preferred embodiments of the systems of the invention described herein, generate randomized, reversing magnetic fields of specific frequency for the purpose of controlling and eradicating rodents and similar pests. It is the discovery of the invention that some low frequency magnetic fields are highly disturbing to certain vertabrate low in the scale of nature, because of remanent defensive instinct responses to geomagnetic disturbances. The preferred embodiments of the systems as set forth herein generate such random, low frequency magnetic fields over a defined zone of influence, and are capable of being both portable and battery-operated for ease of installation. Further, the systems of the invention do not introduce poisons or harmful elements into the environment, as do conventional pest control approaches.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

I claim:

1. Apparatus for generating a low frequency randomly varying magnetic field for the control and eradication of rodents, insects, and the like, said apparatus comprising:

magnetic means having a principal direction for providing a magnetic field in said principal direction, said principal direction oriented parallel to the earth's surface and the local geomagnetic North direction, said magnetic field having a maximum field strength of less than 0.06 mT; modulating means coupled to said magnetic means for randomly varying said magnetic field in frequency and intensity, said magnetic field having a primary frequency in a range greater than zero but less than or equal to 40 Hertz; and mounting means for mounting and supporting said magnetic means and said modulating means, said mounting means disposed so as to mount said magnetic means in close proximity to the earth's surface.

2. Apparatus as in claim 1 wherein said mounting means includes housing means for enclosing said magnetic means and said modulating means, and for shaping said magnetic field in a predetermined configuration, said housing means having a predetermined shape and constructed of a non-ferromagnetic material.

3. Apparatus as in claim 2 wherein said magnetic means comprises a plurality of coil means, each of said plurality of coil means having a non-ferromagnetic core, said coil means responsive to an electric signal for generating said magnetic field.

4. Apparatus as in claim 3 wherein said electric signal comprises a sequence of randomly spaced pulses having randomly varying negative and positive amplitudes.

5. Apparatus as in claim 3 wherein said modulating means comprises:
   first timing means for generating a first clock signal at said primary frequency;
   second timing means for generating a second clock signal; and
   sequencing means responsive to said first and second clock signals for providing a predetermined sequence of pulses for randomly energizing and de-energizing each coil means of said plurality of coil means.

6. Apparatus as in claim 5 wherein each of said plurality of coil means comprise at least one electric coil wound on said non-ferromagnetic core.

7. Apparatus as in claim 5 wherein said plurality of coil means comprise at least two electric coils wound on said non-ferromagnetic core, said non-ferromagnetic core having a predetermined shape.

8. Apparatus as in claim 7 wherein said non-ferromagnetic core is cube shaped, said cube shaped core being coated with a layer of aluminum, each of said two electric coils being wound around a different set of four faces of the cube.

9. Apparatus for generating a low frequency randomly varying magnetic field for the control and eradication of rodents, insects, and the like, said apparatus comprising:
   electromagnetic means for generating a magnetic field, said magnetic field oriented parallel to the earth's surface, and having a maximum magnetic field strength of less than 0.06 mT; and
   circuit means coupled to said electromagnetic means for generating a predetermined sequence of clock signals for randomly energizing and de-energizing said electromagnetic means, said clock signals having a primary frequency in a range greater than zero but less than or equal to 40 Hertz.

10. Apparatus as in claim 9 wherein said circuit means includes switch means responsive to said sequence of clock signals to selectively couple each of said plurality of electromagnetic coils to the electric power source means in a predetermined, repeating sequence whereby a randomly reversing low frequency magnetic field is generated.

11. Apparatus as in claim 10 further including housing means for enclosing said electromagnetic means, and said circuit means, said housing means for shaping said magnetic field in a predetermined configuration, said housing means having a predetermined shape and constructed of a non-ferromagnetic material, said housing means disposed in close proximity to the earth's surface.

12. Apparatus as in claim 10 wherein said circuit means comprises:
   timing means for generating a timing signal at said primary frequency; and
   sequence means responsive to said timing signal for generating said predetermined sequence of clock signals.

13. Apparatus as in claim 12 further comprising electric power source means for providing electric current to said electromagnetic means, and wherein said timing means comprises a low frequency oscillator.

14. A method for the control and eradication of rodents, insects, and the like, said method comprising the steps of:
   orienting a magnetic means to provide a principal magnetic direction that is parallel to the earth's surface and in the direction of local geomagnetic North;
   providing a magnetic field with said magnetic means having a magnetic field strength of less than 0.06 mT, said magnetic field having said principal magnetic direction parallel to the earth's surface and in the direction of local geomagnetic North;
   randomly modulating said magnetic field in intensity, said modulation having a primary frequency in a range greater than zero Hertz but less than or equal to 40 Hertz; and
   disposing said modulated magnetic field in close proximity to the earth's surface.

15. The method as in claim 14 further including the step of shaping said magnetic field in a predetermined configuration.

16. The method as in claim 14 wherein the step of modulating the magnetic field further includes the step of randomly varying the intensity of both polarities of the magnetic field for randomly selectable time periods at randomly selectable times.

* * * * *